United States Patent [19]

Arai et al.

[11] Patent Number: 4,807,326

[45] Date of Patent: Feb. 28, 1989

[54] BACKING MEMBER IN WIPERBLADE OF WINDSHIELD WIPER

[75] Inventors: Masaru Arai; Itsuro Saita, both of Yono, Japan

[73] Assignee: Nippon Wiperblade Co., Ltd., Saitama, Japan

[21] Appl. No.: 157,267

[22] Filed: Feb. 18, 1988

[30] Foreign Application Priority Data

Feb. 20, 1987 [JP] Japan .................... 62-22798[U]

[51] Int. Cl.⁴ .............................................. B60S 1/04
[52] U.S. Cl. .................................................. 15/250.42
[58] Field of Search .................... 15/250.32–250.42

[56] References Cited

U.S. PATENT DOCUMENTS 2,701,382  2/1955  Oishei ........................... 15/250.42
2,767,419  10/1956  Horton .......................... 15/250.42
3,872,537  3/1975  Bianchi ......................... 15/250.42

FOREIGN PATENT DOCUMENTS 1124116  6/1956  France .......................... 15/250.42

Primary Examiner—Peter Feldman
Attorney, Agent, or Firm—Wenderoth, Lind & Ponack

[57] ABSTRACT

A backing member of a wiperblade of a windshield wiper and comprising two elongated body elements extending parallel at a spaced apart relationship and extending substantially along the entire length of a blade rubber to which the backing member is mounted, a plurality of bridge portions being spaced apart in the longitudinal direction of the backing member and connecting the body elements, the space between the body elements being adapted to receive a neck portion of the blade rubber, the bridge portions extending in the sidewise direction and above the body elements so as to define a space above the body elements for receiving a head portion of the blade rubber, and two longitudinally spaced apart pivot connections for connecting with a yoke member of the wiper. At least one of the pivot connections is adapted to permit relative longitudinal displacement of corresponding pivot connection of the yoke member. The curvature and the rigidity of the backing member are changed in the longitudinal direction.

7 Claims, 2 Drawing Sheets

BACKING MEMBER IN WIPERBLADE OF WINDSHIELD WIPER

FIELD OF THE INVENTION

The present invention relates to a windshield wiper and, particularly to a backing member in a wiperblade of the windshield wiper.

DESCRIPTION OF PRIOR ART

It is important that a blade rubber contacts with the surface of a windshield being wiped under a uniform pressure distribution along the length thereof or in the longitudinal direction for enabling satisfactory wiping effects. Usually, one or more resilient metal strips are disposed on the upper surface of the blade rubber so that a pressing force transmitted from a yoke member is dispersed in the longitudinal direction and is transmitted to the tip or the lower end of the blade rubber. It is also known to form the yoke member of a plurality of pivotally connected yoke elements so that the force is transmitted to the wiperblade through plural locations. When the force is transmitted from the yoke member to the wiperblade through a small number of locations, it is difficult to obtain uniform pressure distribution. And the yoke member including a multiple number of mutually pivotally connected yoke elements is complicated in construction and is expensive.

The present invention has been made in view of the circumstances aforementioned, and aims to provide a backing member for enabling uniform pressure distribution along the length of the blade rubber.

SUMMARY OF THE INVENTION

A backing member according to the invention comprises two elongated body elements extending substantially along the entire length of a blade rubber to which the backing member is mounted and extending parallel at a spaced apart relationship, a plurality of bridge portions being spaced apart in the longitudinal direction of the backing member and connecting the body elements, the space between the body elements being adapted to receive a neck portion of the blade rubber, the bridge portions extending in the sidewise direction and above the body elements so as to define a space above the body elements for receiving a head portion of the blade rubber, two longitudinally spaced apart pivot connections for connecting with a yoke member of a wiper, at least one of the pivot connections being adapted to permit relative longitudinal displacement of corresponding pivot connection of the yoke member, and the curvature of the lower surfaces of the body elements and the rigidity of the backing member being changed in the longitudinal direction.

Preferably, the rigidity is high at the pivot connections and is low at the longitudinally central portion and at opposite end portions.

The curvature is preferably small at opposite end portions and is large at the central portion. Further, the curvature at the longitudinally central portion may be opposite sense or downwardly convex.

The backing member may be used together with metal strips, otherwise, metal strips may be embedded in the backing member of synthetic resin material.

Preferably, cutout portions are formed in the body elements at locations where the bridge portions are connected to the body elements, whereby the backing member can easily formed by die forming process.

According to the invention, the backing member can easily be formed to have desired rigidity against bending, thus, it is not required to connect the wiperblade to the yoke member through three or more points for obtaining uniform pressure distribution, thus, it is simple in the construction and cheap in the cost.

BRIEF DESCRIPTION OF THE DRAWINGS

Further objects and effects of the invention will become apparent from the following detailed description taken in conjunction with the drawings, in which.

DETAILED DESCRIPTION OF PREFERRED EMBODIMENTS

Figure 1:
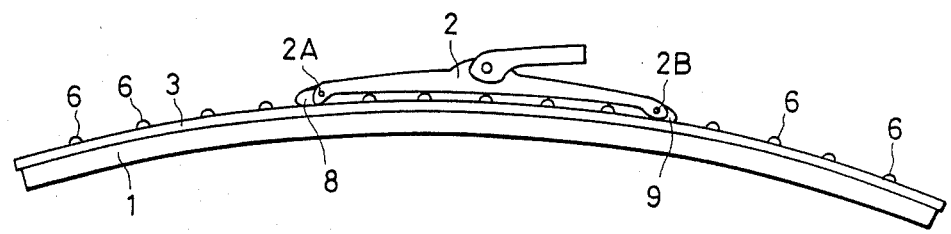
FIG. 1 is a schematic side view of a wiperblade having a backing member according to present invention.
Figure 2:
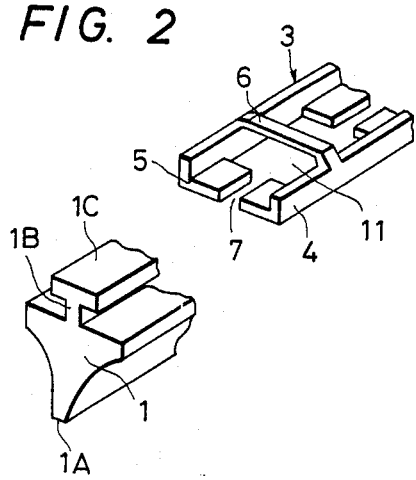
FIG. 2 is a partial perspective view showing portions of a blade rubber and the backing member of FIG. 1.
Figure 3:
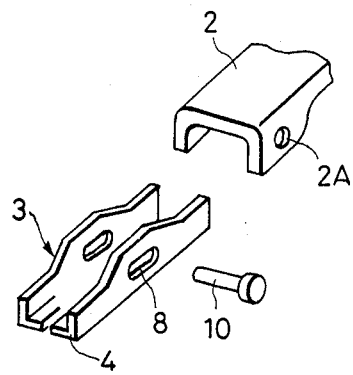
FIG. 3 is a partial perspective view showing portions pivotally connecting the backing member of FIG. 1 with a yoke member.

Referring particularly to FIGS. 1-3, shown at numeral 1 is a blade rubber, at 2 is a yoke member connected to a wiper arm (only a part is shown) and, at 3 is a backing member according to the invention. The blade rubber 1 comprises a tip end or a wiping end 1A, a neck portion 1B and a head portion 1C. The yoke member 2 is connected to the backing member 3 through pivot connections 2A and 2B. The backing member 3 comprises two elongated body elements 4 and 5 extending substantially along the entire length of the blade rubber 1 to which the backing member 3 is mounted. The backing member 3 and the blade rubber 1 are the major components of a wiperblade. The body elements 4 and 5 define a space 7 therebetween, and the space 7 is adapted to receive the neck portion 1B of the blade rubber 1. A plurality of bridge portions 6, 6. . . being spaced apart in the longitudinal direction of teh backing member 3 act to connect the body elements 4 and 5 to each other. The bridge portions extend in the sidewise direction and above the body elements 4 and 5 so as to define a space above the body elements for receiving the head portion 1C of the blade rubber 1. There are provided on the backing member 3 two longitudinally spaced apart pivot connections 8 and 9 for connecting with the yoke member 2. As shown in FIG. 1, the pivot connection 8 corresponds to the pivot connection 2A of the yoke member and the pivot connection 9 corresponds to the pivot connection 2B of the yoke member 2. At least one of the pivot connections 8 and 9 is formed to permit a relative longitudinal displacement of corresponding pivot connection of the yoke member 2. In the embodiment, the pivot connection 8 is formed of elongated openings. Shown at 10 is a pivot pin, howeover, the pivot pin may be substituted by other suitable means.

As shown in FIG. 2, cutouts 11 are formed in the body elements 4 and 5 at locations corresponding to the bridge portions 6, whereby the backing member 3 can easily be formed by die forming process and of synthetic resin material. Further, there is provided means for restricting relative longitudinal displacement between the backing member 3 and the blade rubber 1. Such means may include a clip mounted on the backing member 3 preferably at one longitudinal end for clamping the blade rubber. Otherwise, it is possible to form the space 7 to zero at one or both longitudinal ends of the backing member 3, and the blade rubber is inserted through one of the cutouts 11 adjacent to one end.

Figure 4:
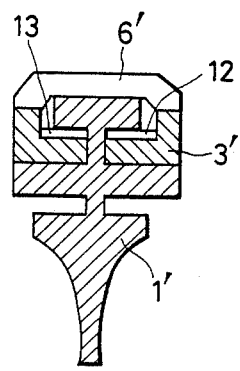
FIG. 4 is a sectional view showing the backing member of the invention and a blade rubber.

Preferably, the backing member 3 is formed to have the cross-sectional configuration as shown in a backing member 3' of FIG. 4, so as to have a suitable rigidity against bending or against bending along a plane perpendicular to the sheet of FIG. 4, whereby the force transmitted from the yoke member can uniformly dispersed along the length of the blade rubber.

The wiperblade shown in FIG. 4 has metal strips 12 and 13 inserted between the backing member 3' and the blade rubber 1' to augment the resiliency. The resilient metal strip may be embedded integrally in the backing member.

Figure 5:
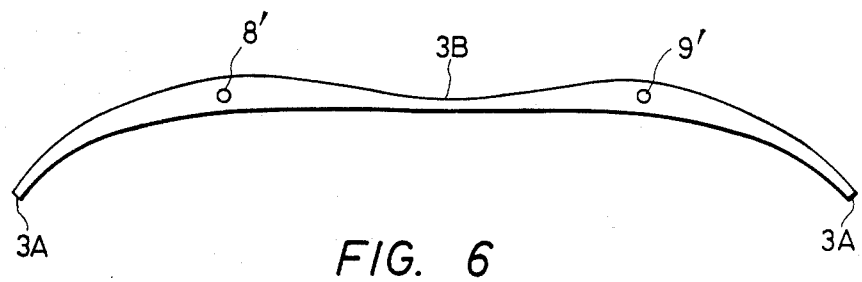
FIG. 5 is a side view of the backing member under no load condition.

FIG. 5 shows a side view of the backing member 3 at no load condition. The curvature is gradually decreased at longitudinally opposite end portions 3A and 3A, and the rigidity against bending is large at and adjacent to the pivot connections 8' and 9', and is small at opposite end portions 3A and 3A and at the central portion 3B. Thus, the pressure distribution along the length of the blade rubber is uniform, and the wiperblade can follow a curved windshield.

Figure 6:
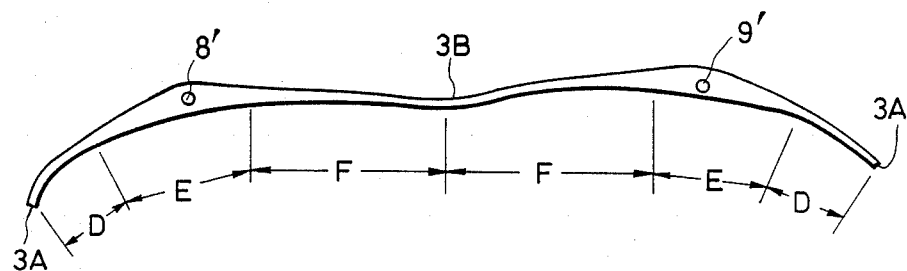
FIG. 6 is a view similar to FIG. 5 but showing a modified backing member.

FIG. 6 shows a modified form, wherein the curvature at the longitudinally central portion is of opposite sense or convex in the downward direction. The curvature is small at zones D adjacent to opposite end portions 3A, medium at zones E adjacent to pivot connections 8 and 9, and large at zones F and F adjacent to the central portion 3B. The embodiment enables to obtain relatively uniform pressure distribution with respect to a wide range between a low pressure and a high pressure and, further, it is possible to prevent excessive decreases of the pressure at the central portion.

Figure 7:
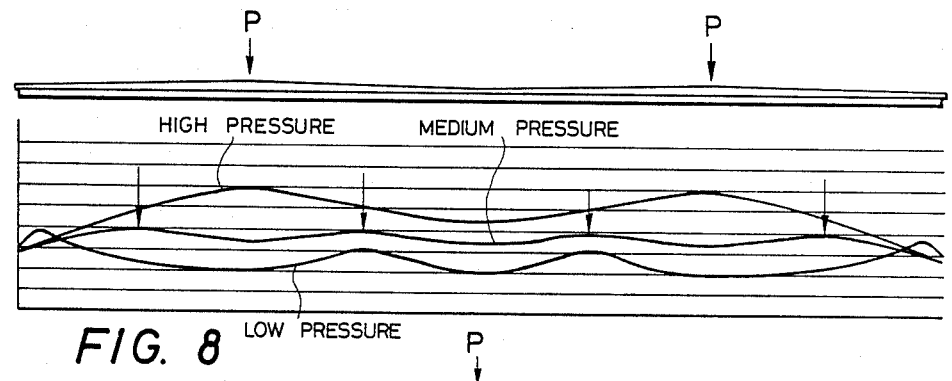
FIG. 7 is a graph showing change in the pressure distribution at the tip end of the blade rubber according to the invention.
Figure 8:
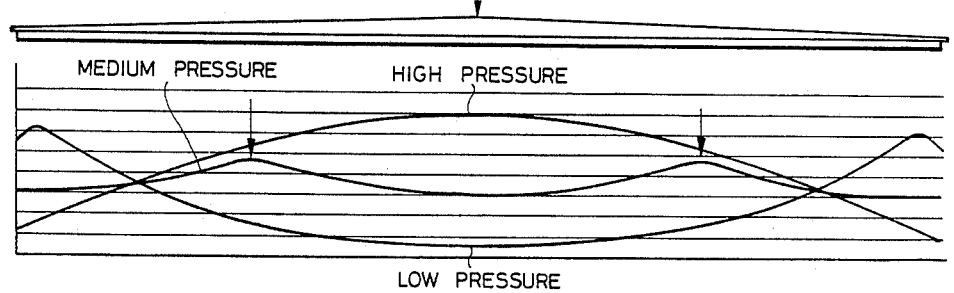
FIG. 8 is a graph similar to FIG. 7 but showing a prior art backing member.

FIGS. 7 and 8 show the change in the pressure distribution at the tip end or the wiping end 1A of the blade rubber 1 when the pressing force applied on the wiperblade from the yoke member is changed. FIG. 7 shows the result according to the invention, and FIG. 8 shows prior art wiperblade. According to the invention, the pressure change in the longitudinal direction is small, and pressure change at opposite end portions when the pressing force is changed is also small. Thus, the blade rubber contacts with the surface of the windshield within a suitable range of inclination angle. Therefore, the wiping property is good, and since a wide range of pressing force can be applied, it is possible to decrease the types of the wiperblade.

What is claimed is:

1. A backing member in a wiperblade of a windshield wiper, said backing member comprises two elongated body elements extending parallel at a spaced apart relationship and extending substantially along the entire length of a blade rubber to which the backing member is mounted, a plurality of bridge portions being spaced apart in the longitudinal direction of the backing member and connecting the body elements, the space between the body elements being adapted to receive a neck portion of the blade rubber, the bridge portions extending in the sidewise direction and above the body elements so as to define a space above the body elements for receiving a head portion of the blade rubber, and two longitudinally spaced apart pivot connections for connecting with a yoke member of the wiper, at least one of the pivot connections being adapted to permit relative longitudinal displacement of corresponding pivot connection of the yoke member, and the curvature of the lower surfaces of the body elements and the rigidity of the backing member being changed in the longitudinal direction.

2. A backing member as set forth in claim 1, wherein the rigidity is high at the pivot connections and is low at the longitudinally central portion and at opposite end portions.

3. A backing member as set forth in claim 1, wherein the curvature is small at opposite end portions and is large at the central portion.

4. A backing member as set forth in claim 1, wherein the curvature at the longitudinally central portion is downwardly convex.

5. A backing member as set forth in claim 1, wherein metal strips are embedded in the backing member of synthetic resin material.

6. A backing member as set forth in claim 1, wherein cutout portions are formed in the body elements at locations where the bridge portions are connected to the body elements, whereby the backing member can easily formed by die forming process.

7. A backing member as set forth in claim 1, wherein means for restricting relative displacement of the blade rubber is provided on one longitudinal end portion of the backing member.

* * * * *